(12) United States Patent
Bhutani et al.

(10) Patent No.: US 11,323,532 B1
(45) Date of Patent: May 3, 2022

(54) DATA STREAM PACKAGING

(71) Applicant: salesforce.com, inc., San Francisco, CA (US)

(72) Inventors: Sahil Bhutani, Alameda, CA (US); Naveen Singh Jaunk, Lafayette, CA (US); William Yeh, Alameda, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/162,655

(22) Filed: Jan. 29, 2021

(51) Int. Cl.
| | | |
|---|---|---|
| *H04L 12/50* | (2006.01) | |
| *H04L 67/561* | (2022.01) | |
| *H04L 67/02* | (2022.01) | |
| *H04L 29/06* | (2006.01) | |
| *H04L 67/00* | (2022.01) | |
| *H04L 67/60* | (2022.01) | |
| *G06F 16/176* | (2019.01) | |
| *G06F 8/60* | (2018.01) | |

(52) U.S. Cl.
CPC ...... *H04L 67/2804* (2013.01); *H04L 63/0442* (2013.01); *H04L 67/02* (2013.01); *H04L 67/32* (2013.01); *H04L 67/34* (2013.01)

(58) Field of Classification Search
USPC ...................................................... 709/223
See application file for complete search history.

(56) References Cited

U.S. PATENT DOCUMENTS

| | | | | |
|---|---|---|---|---|
| 9,201,558 B1* | 12/2015 | Dingman | .............. | G06F 16/252 |
| 9,430,114 B1* | 8/2016 | Dingman | ................ | G06F 16/25 |
| 10,521,211 B2* | 12/2019 | Brooks | ................ | G06F 16/972 |
| 2009/0132232 A1* | 5/2009 | Trefler | .................. | G06Q 10/10 704/8 |
| 2013/0073939 A1* | 3/2013 | Honsowetz | ............. | G06F 40/18 715/212 |
| 2014/0033198 A1* | 1/2014 | Umapathy | .............. | G06F 16/00 717/176 |
| 2015/0074659 A1* | 3/2015 | Madsen | .............. | G06F 9/45558 717/177 |
| 2016/0358013 A1* | 12/2016 | Carter | ..................... | G06F 21/32 |
| 2017/0034023 A1* | 2/2017 | Nickolov | ............ | H04L 43/0817 |
| 2018/0343300 A1* | 11/2018 | Halter | ................... | G06F 9/5088 |
| 2019/0220267 A1* | 7/2019 | Chen | ....................... | H04L 63/12 |

\* cited by examiner

*Primary Examiner* — Jude Jean Gilles
(74) *Attorney, Agent, or Firm* — Holland & Hart LLP

(57) ABSTRACT

Methods, systems, and devices for data packaging at an application server are described. According to the techniques described herein, a device (e.g., an application server) may receive a link to a data stream package that defines metadata of a data source and an import schedule associated with importing streaming data from the data source to a data target associated with the application server. The device may install the data stream package based on the received link and import the streaming data from the data source according to the import schedule based on installing the data stream package. The device may then map, based on the metadata of the data source defined in the data stream package, a set of source data fields of the data source to a set of target data fields of the data target.

20 Claims, 10 Drawing Sheets

DATA STREAM PACKAGING

FIELD OF TECHNOLOGY

The present disclosure relates generally to database systems and data processing, and more specifically to data stream packaging.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

The cloud platform may support a number of applications and pages for viewing CRM information, updating data records, or performing other CRM or data-related activities. Users may access these applications and pages on different user devices. The cloud platform may support a data platform for customers. In addition, a cloud platform (e.g., CRM systems) may support multiple data records or data objects for multiple tenants. Some systems supporting user interaction with data records can be improved.

DETAILED DESCRIPTION

Figure 1:
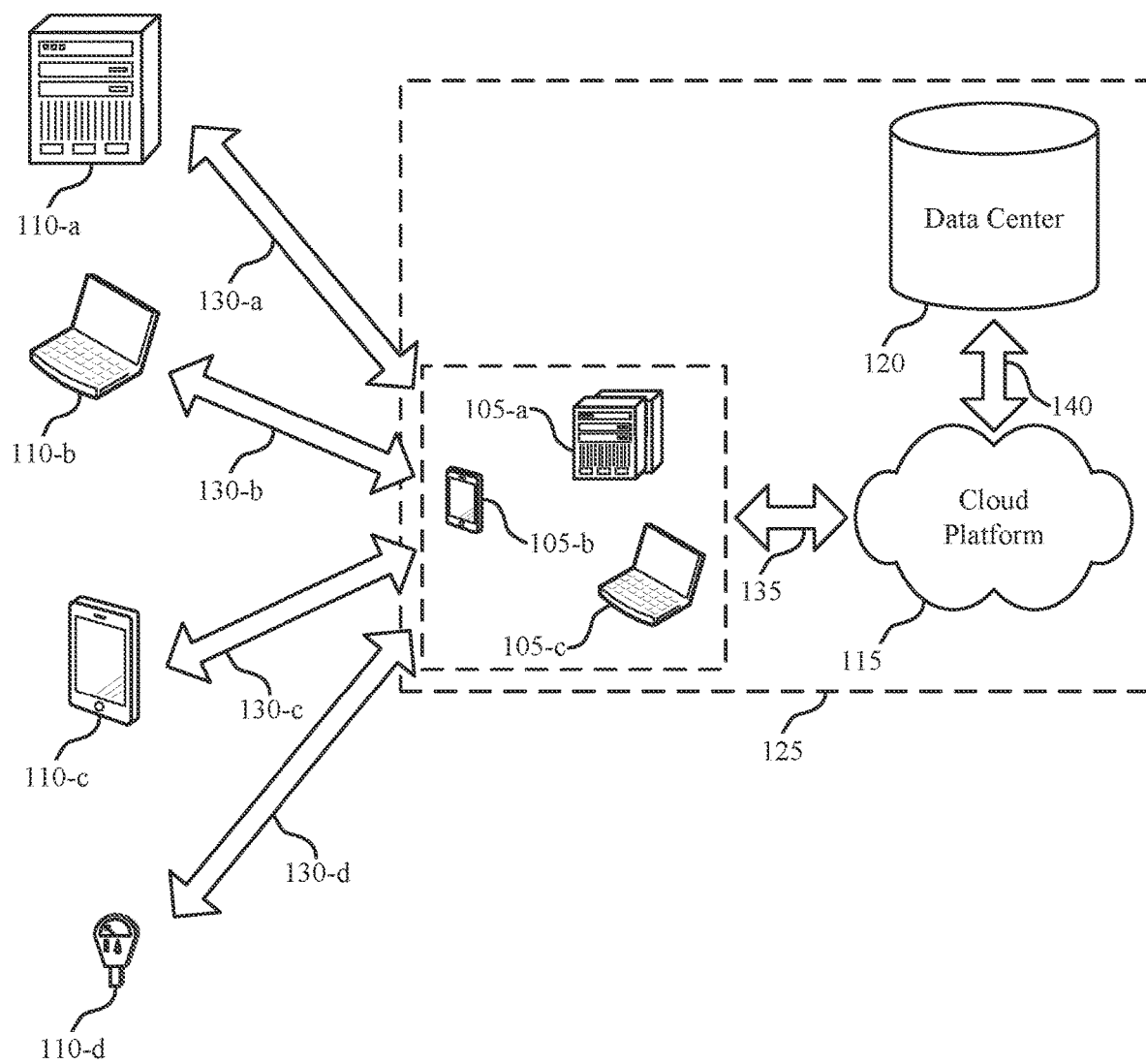
FIG. 1 illustrates an example of a system that supports data stream packaging in accordance with aspects of the present disclosure.

A system (e.g., a cloud-based system supporting customer relationship management (CRM) solutions) may support a number of applications, pages, or both for displaying components. These components may display information, perform defined actions, provide links to other applications (e.g., third-party applications outside the cloud-based system), or provide any number of other features as indicated in the component definitions. A tenant of a multi-tenant database may store information and data for users, customers, organizations, etc. in a database. As depicted herein, a cloud platform (e.g., CRM systems) may support multiple data records or data objects for multiple tenants. A cloud platform (e.g., a CRM system) may thus support a data platform for customers.

According to one or more aspects, a user of the cloud platform (e.g., a partner) may deploy a data stream for consumption by one or more second users (e.g., customers). In particular, a customer data platform (implemented on a cloud platform) may support multiple customers importing data from various sources. That is, one or more users (e.g., customers) may import internal data or data from other applications and platforms to the cloud platform. In some examples, a first user (e.g., a marketer) may import the data from a data source. Additionally or alternatively, the first user may define metadata associated with the data imported from the data source, a schema and a schedule for importing data. As such, the first user (e.g., a marketer) may define a data stream based on the metadata of the data source, the schema and the schedule. Once configured, the data stream may automatically import data from the data source into a target data location (e.g., within a customer data platform) according to the configured scheduled (e.g., once per day). The metadata of the data source and schema may define how the data in the data source is structure or organized, and how the data maps from the data source to the target data location (e.g., which columns of the data source map to which columns in the target data location). If the schema and the schedule is same for a new data block, but the data source is different, then the first user (e.g., a marketer) may need to redefine the data stream configuration for the new data block. Additionally or alternatively, if the same configuration is replicated in another environment, the first user (e.g., a marketer) may redefine the metadata of the data source, the schema and the schedule for importing data manually. For example, a marketer may define various parameters associated with a data stream when importing data from a data source. The marketer may then deploy the data to multiple customers. In some systems, each customer may redefine the data stream based on the metadata of the data source. Thus, the process of deploying a data stream may be inconsistent and cumbersome and there exists a need for deploying data streams with minimal manual configuration to reduce errors.

Various aspects of the present disclosure provide techniques for implementing data stream packaging. Techniques described herein may support data stream prepackaging for consumption by users in a multi-tenant system. In particular, an application server may use the techniques depicted herein to deploy packaged metadata to users thereby reducing the errors in deploying data streams. Thus, the aspects of the present disclosure may be used to reduce the challenges of setting up a data stream by customers. In particular, the techniques described herein provide for deploying data streams based on the metadata movement of data stream configuration via packaging the data stream.

According to one or more aspects, a first user (e.g., a marketer or administrator or in-house representative of a partner) may create a data stream using credentials, file name, source details, and mapping information. For example, the first user may provide a user input including one or more parameters at a first user interface. The first user interface may be associated with an instance of an application that is associated with the first user (e.g., an instance of an enterprise customer data platform application owned by the first user). In some examples, the one or more parameters may describe at least one of a data source, an import schedule associated with importing streaming data, a schedule for data refresh, customization information, or a combination thereof. When a data stream is created, one or more aspects of the present disclosure may provide for the underlying data stream to become packageable, such as in a template or other packageable format that facilitates transmission of the package to another device for unpackaging and use at the other device. A data package may be configured as or otherwise include a folder of data streams and their related objects. With a data stream package created, the first user may deploy the data stream to other environments. For instance, the first user may send a link of the packaged data stream to one or more other users. In another example, the first user may upload the data stream package or template to an application exchange that hosts applications for download by multiple users. A second user may receive a link to the data stream package and may install the data steam package. For example, the second user may receive a link to the data stream package that defines metadata of the data source and the import schedule associated with importing streaming data from the data source (e.g., the import schedule defined by the first user) to a data target associated with a server or datastore associated with the second user. For example, the second user may be running an instance of a customer data platform that is different than the instance of the customer data platform of the user that initially created the data stream package.

The second user may then install the data stream package (e.g., on an application server or local machine) based on the received link. Installing the data stream package may automatically configure the data stream for importing data to a data target (including the metadata and the mapping between metadata) created by the first user (e.g., using the first user interface or the first instance of an application). For example, based on installing the data stream package, an application server may import the streaming data from the data source according to the import schedule. The application server may map, based on the metadata of the data source defined in the data stream package, a set of source data fields of the data source to a set of target data fields of the data target. Thus, packaging of a data stream allows customers to deploy pre-configured streams with the flexibility of adjusting certain attributes and eases the cumbersome process of data stream setup.

Aspects of the disclosure are initially described in the context of an environment supporting an on-demand database service. Aspects of the disclosure are further described with respect to a general system diagram that shows computing components and data flows that support implementing data stream packaging that support the techniques herein. Aspects of the disclosure are further illustrated by and described with reference to apparatus diagrams, system diagrams, and flowcharts that relate to data stream packaging.

FIG. 1 illustrates an example of a system 100 for cloud computing that supports data stream packaging in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may be example of a multi-tenant system that supports data storage, retrieval, data analytics, and the like for various tenants, such as the cloud clients 105. As such, each cloud client 105 may be provided with a database instance in the data center 120, and each database instance may store various datasets that are associated with the particular cloud client 105. More particularly, each cloud client 105 may have a specific set of datasets that are unique for the cloud client 105. The cloud platform and data center 120 support a system that processes set of datasets for a particular cloud client 105. Additionally or alternatively, the subsystem 125 may support data stream related to CRM processes, data management, messaging, or any other supported functionality. One or more aspects of the present disclosure may support deploying data streams across multiple database instances. For instance, a first user may import a data stream from a data source and define metadata associated with the data stream. In addition, the first user may define a schema and a schedule for importing the data stream and create a data package including one or more data streams. With the data package created, the first user may deploy the one or more data streams to other environments. For instance, the first user may send a link of the packaged data stream to one or more other users (e.g., directly or by uploading a link to the data package to an application exchange). A second user may receive the link and may install the data steam package. Installing the data stream package may automatically import the data stream including the metadata and the mapping between the metadata.

Conventional systems may support defining a data stream, metadata of the data stream, a data source, a schema and a schedule for data retrieval. In particular, a customer data platform (implemented on a cloud platform) may support multiple customers importing data from various sources. That is, a first user (e.g., a marketer) may import the data from a data source and define a metadata of associated with the data imported from the data source. However, conventional systems may not provide for deploying a schema and a schedule for a first data block to a new data block. If the same configuration is replicated in a different environment, conventional systems may not provide for a method to reuse a definition of the metadata of the data source, the schema and the schedule for importing the data. Thus, the process of deploying data stream may be inconsistent and cumbersome and there exists a need for deploying data streams with minimal manual configuration to reduce errors. As such, the inconsistent process of deploying data may result in a poor user experience in current systems.

In contrast, the cloud platform and data center 120 support a system that supports techniques for data stream prepackaging for consumption by one or more users. The system 100 may also improve the user experience at user devices running the application by enhancing data deployment techniques and ability to interact with the user interface. An application supporting data stream packaging may simultaneously be used by multiple users. The application server (hosted in subsystem 125) may receive a link to a data stream package that defines metadata of a data source and an import schedule associated with importing streaming data from the data source to a data target associated with the application server. The application server may then receive an input from a user to install the data stream package based on the received link. Upon installing the data stream, the application server may import the streaming data from the data source according to the import schedule. The application server may further provide for map, based on the metadata of the data source defined in the data stream package, a set of source data fields of the data source to a set of target data fields of the data target.

It should be appreciated by a person skilled in the art that one or more aspects of the disclosure may be implemented in a system 100 to additionally or alternatively solve other problems than those described herein. Further, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

A cloud client 105 may be an example of a user device belonging to a customer of a customer data platform. A first user (e.g., a marketer) may use the cloud client 105 to import data from various sources. In particular, the customer data platform supports customers importing data from various sources. For example, a customer of the cloud platform 115 may import internal data or data from other applications and platforms. When importing the data from a data source, the first user may define the metadata of the data source, a schema and a schedule for importing data. Thus, the customer of the cloud platform 115 may define a data stream based on the metadata of the data source, the schema and the schedule. When a data stream is created, one or more aspects of the present disclosure provides for creating a data stream package. With a data stream package created, a customer of the cloud platform 115 can then deploy the data stream to other users of the cloud platform 115. The creator of the data package may send a link (e.g., uniform resource locator) or an otherwise downloadable or executable file for the data stream package to a second user.

In some examples, a user of an application server (e.g., customer of the first user where the first user is a marketer) may receive a link to a data stream package that defines metadata of a data source and an import schedule associated with importing streaming data from the data source to a data target associated with the application server. The user may provide an input to install the data stream package. The application server may then import the streaming data from the data source according to the import schedule based on installing the data stream package and map a set of source data fields of the data source to a set of target data fields of the data target. In some examples, the application server may map the set of source data fields based on the metadata of the data source defined in the data stream package.

In one use case example, a first organization may collect data related to real estate values, real estate purchase history, real estate rental history, and information related to buyers and sellers of real estate, such as demographic information and the like. A second organization may wish to access the information aggregated by the first organization for analytics or marketing purposes. For example, the second organization may employ a customer data platform or similar CRM system that supports analysis of segments of individuals for analytics, customer support, or marketing purposes. The customer data platform may support a data model having defined objects and functionality associated with those objects. For example, the customer data platform may include objects that store data related to contact information, demographic information, purchase history, etc. To utilize the data collected by the first organization, an individual (e.g., an information technology (IT) manager) may manually create a data stream that supports importing data from the first organization into the data model employed by the second organization. As described herein, the data stream configuration may include a definition of metadata that defines how data of the first organization maps to the data model or objects supported by the second organization, and an import schedule, and other parameters related to how the data is imported (e.g., only when data is updated, refreshing all data, only refreshing changes in data, etc.). Utilizing techniques described herein, the first organization may define a package (e.g., a data stream package) that includes the configurations and parameters defining the streaming data import, and share this package with the second organization (e.g., through an online application exchange or similar) or various other organizations. In this way, the second organization may install the package, which will automatically configure the streaming data import from the data source of the first organization into the data model supported by the second organization.

Figure 2:
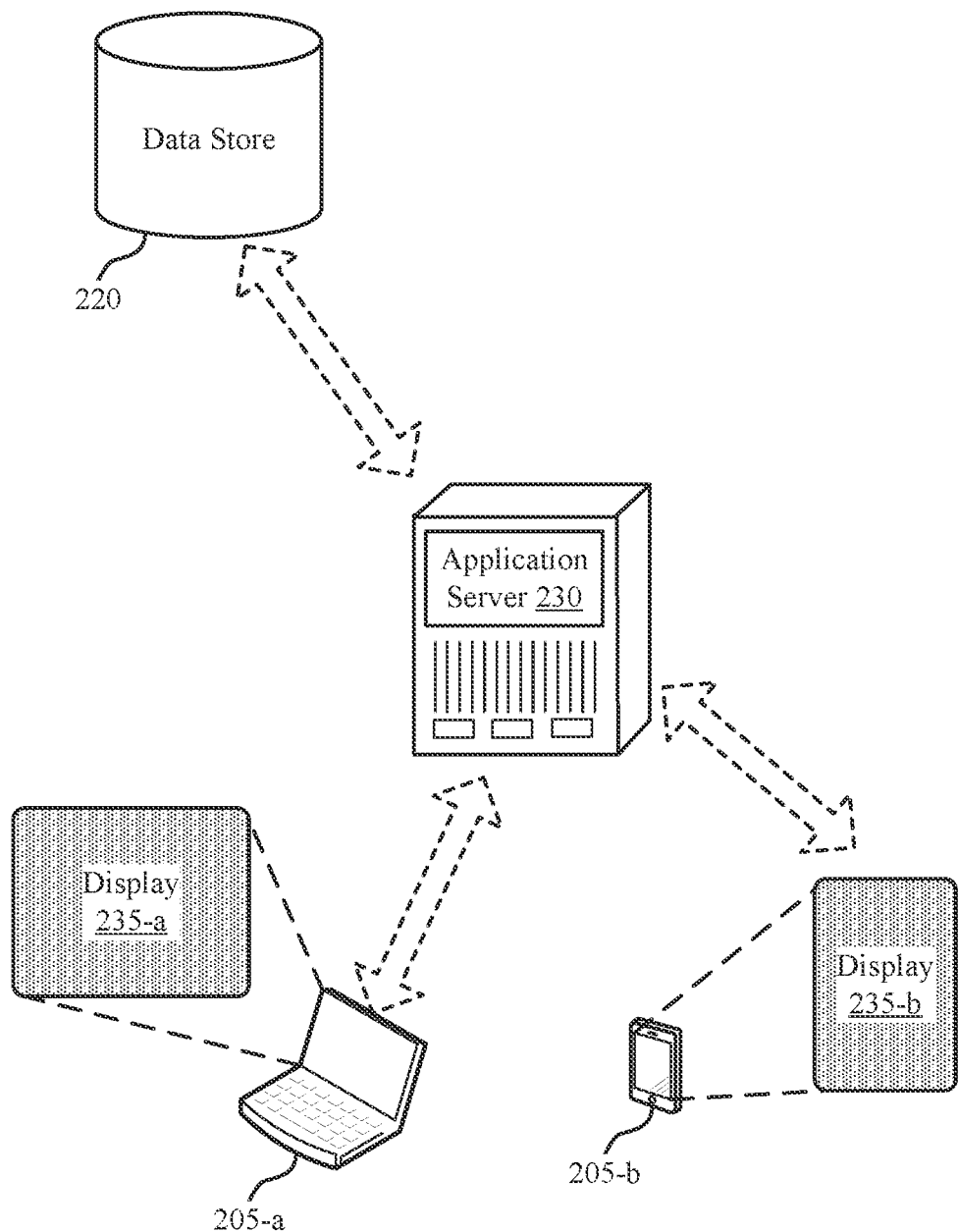
FIG. 2 illustrates an example of a system that supports data stream packaging in accordance with aspects of the present disclosure.

FIG. 2 illustrates an example of a system 200 that supports data stream packaging in accordance with aspects of the present disclosure. The system 200 may include a number of user devices 205, which may be examples of cloud clients 105 or contacts 110 as described with reference to FIG. 1. The application server 230 may be examples of aspects of the cloud platform 115 and the data center 120 of FIG. 1. For example, the application server 230 may represent various devices and components that support an analytical data system as described herein. The data store 220 may be an example of data center 120 of FIG. 1. The application server 230 may support a multi-tenant database system, which may manage various datasets that are associated with specific tenants (e.g., cloud clients 105).

A first user (e.g., an administrative user, a marketer, partner, etc.) may operate a first user device 205-a running an application to data stream package. Using user device 205-a and the application, the first user may import a data stream and input an instruction to create a data stream package. For example, the first user may input the instruction into a display 235-a associated with the first user device 205-a. As depicted herein, the data stream packaging may be displayed in different user interfaces. In some examples, the same application (e.g., supported by a single underlying metadata file or container) may be displayed differently on different user devices 205 corresponding to different user interface types. A user accessing an application or page on a user device 205-a (e.g., a laptop or desktop computer corresponding to a large form factor) may view a first display 235-a, while a user accessing the same application or page on a user device 205-b (e.g., a mobile phone corresponding to a small form factor) may view a second display 235-b. Thus, the user accessing an application or page on a user device 205 may view or otherwise interact with data stream package via a display 235.

One or more aspects of the present disclosure may support creating data stream packages on a first user device 205-a (using input received via display 235-a) and deploying the data stream to a second user device 205-b (using a link displayed on display 235-b). Thus, the techniques depicted herein provide for portability of a data stream package across different user interfaces, user devices, instances of an application, tenants of a multi-tenant database system, or some combination of these.

An application launcher at a user device 205 may indicate the applications or pages that are activated and available for the user device. In some cases, activating an application or page may push the application or page to a centralized system or server (e.g., an application server 230). Other user devices 205 may then access and display the activated application or page by interacting with the application server 230 (e.g., via an API). In some cases, when operating online, running an application or page at a user device 205 may involve a link between the user device 205 and the application server 230 storing information about the application or page (e.g., a display template). In other cases, when operating offline, the user device 205 may store the information about the application or page locally. In some examples, the user device 205 may initially download support for the application or page from the application server 230 before running the application or page without requiring further interactions with the application server 230.

According to one or more aspects of the present disclosure, a first user (e.g., an administrative user, a marketer, partner, etc.) operating the first user device 205-a may import a data stream from the data store 220. In some examples, the first user may import internal data or data from other applications and platforms to the cloud platform. The first user (e.g., a marketer) may define a metadata associated with the data imported from the data source, a schema and a schedule for importing data. For instance, the first user may indicate that data may be imported periodically during a time period each day. Additionally or alternatively, the first user may input an instruction to map the data from the data store to a data target associated with the application server 230. In this, the first user (e.g., a marketer) may define a data stream based on the metadata of the data source, the schema associated with the data target and the schedule for importing data. In addition, the first user may define additional parameters associated with a data stream when importing data from the data store 220 (e.g., data source) and then create a data package. Techniques described herein may support data stream prepackaging for consumption by users in a multi-tenant system. In particular, the application server 230 may use the techniques depicted herein to package data streams and deploy the packaged data streams to users thereby reducing the errors in deploying data streams.

When a data stream is created and packaged, a data package may be configured as or otherwise include a folder of data streams and their related objects. With a data stream package created, the first user may deploy the data stream to other environments. For instance, the first user may initiate generation of a link for the packaged data stream for deploying the packaged data stream to one or more other users (e.g., by uploading the link or data stream package to an application exchange). A second user (e.g., a customer of the marketer or another user associated with the first user) operating the second user device 205-b may receive the link. For example, the second user device 205-b may receive a link (via display 235-b) to a data stream package that defines metadata of the data source (e.g., data store 220) and an import schedule associated with importing streaming data from the data source to a data target associated with the application server 230. That is, the second user device 205-b may receive an executable metadata associated with the data stream package that defines the metadata of the data store 220 and the import schedule.

In some examples, the second user device 205-*b* in conjunction with the application server 230 may install the data stream package based on the received link. For example, the second user operating the second device 205-*b* may receive a link to the data stream package that defines metadata of the data store 220 and the import schedule associated with importing streaming data from the data store 220 (e.g., the import schedule defined by the first user) to a data target associated with the application server 230. In some aspects, installing the data stream package may automatically import the data stream (including the metadata and the mapping between metadata) created by the first user (e.g., using the first device 205-*a*). In the example of FIG. 2, the application server 230 may import the streaming data from the data store 220 according to the import schedule based on installing the data stream package. In some examples, the second user may provide an input indicating the data store 220. The application server 230 may import the streaming data from the data store 220 according to the import schedule based on installing the data stream package and receiving the input indicating the data source.

As part of installing the data stream package, the application server 230 may deploy the data stream package. The second user may use the user device 205-*b* to provide authentication information including at least one access key and at least one secret key. The application server 230 thus receives an input including at least one access key and at least one secret key based on deploying the data stream package. In some examples, importing the streaming data from the data store 220 according to the import schedule may be based on receiving the input including at least one access key and at least one secret key.

The application server 230 may then map, based on the metadata of the data store 220 defined in the data stream package, a set of source data fields of the data source to a set of target data fields of the data target. In some examples, the application server 230 may verify a data model based on importing the streaming data from the data source according to the import schedule. In some examples, mapping the set of source data fields of the data source to the set of target data fields of the data target may be based on verifying the data model. According to one or more aspects, the application server 230 may identify customization information associated with the set of source data fields based on the metadata of the data store 220 defined in the data stream package. In some examples, the application server 230 may validate the mapping of the set of source data fields of the data source to the set of target data fields of the data target. As depicted herein, packaging of a data stream and deploying the prepackaged data stream across multiple user instances (e.g., to multiple users) allows marketers to deploy pre-configured streams to multiple customers with the flexibility of adjusting certain attributes. Thus, the techniques depicted herein eases the process of data stream setup and addresses the deficiencies in existing systems.

Figure 3:
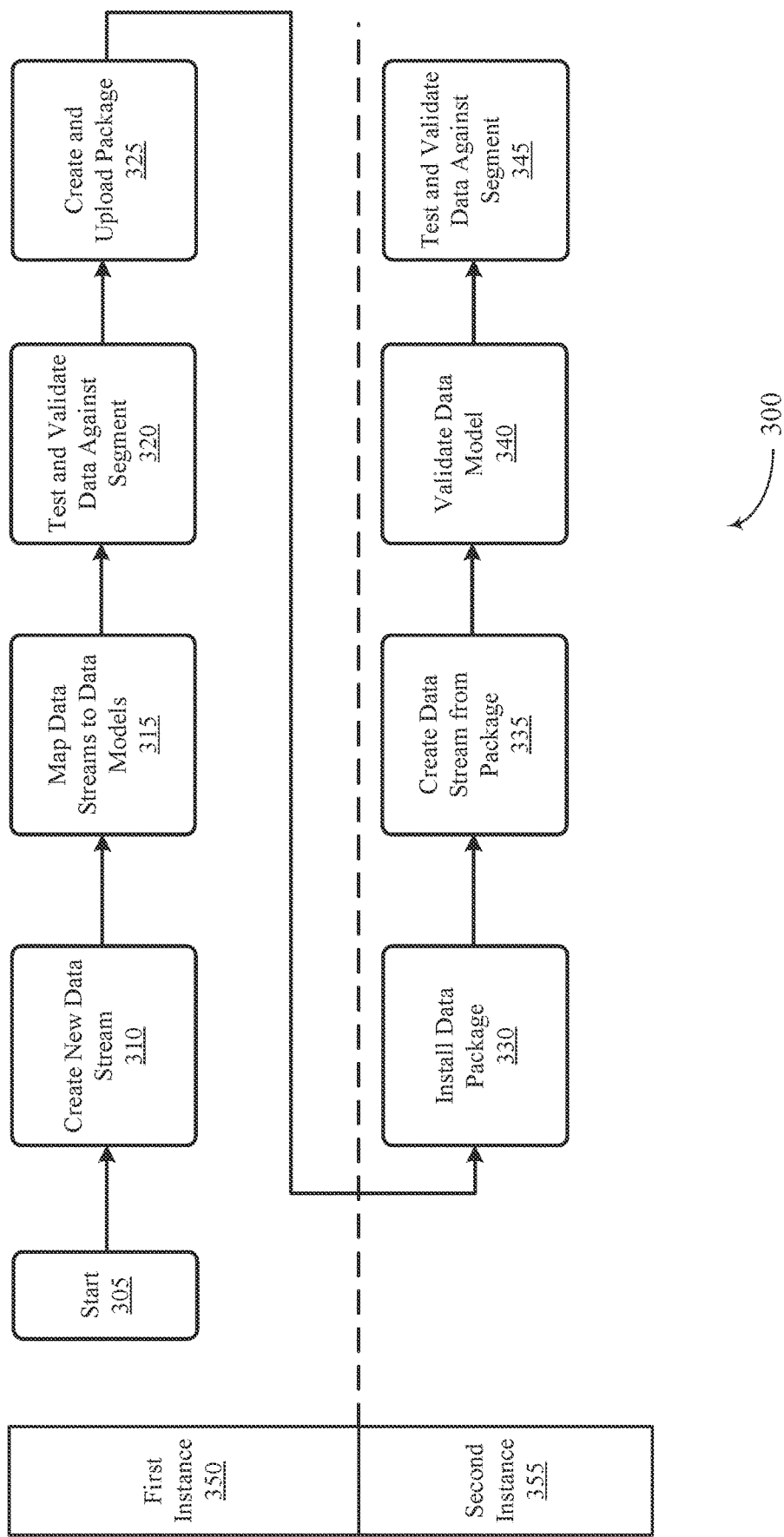
FIG. 3 illustrates an example of a process flow diagram that supports data stream packaging in accordance with aspects of the present disclosure.

FIG. 3 illustrates an example of a process flow diagram 300 that supports data stream packaging in accordance with aspects of the present disclosure. The process flow diagram 300 includes a first instance 350 and a second instance 355. The first instance 350 and the second instance 355 may be examples of instances of an application associated with different entities (e.g., tenants), and each instance may be implemented at a user device in combination with a server. The user device may be an example of a user device 205 as described with respect to FIG. 2, and the server may be an example of the application server 230 as described with respect to FIG. 2. The server may represent a set of computing components, data storage components, and the like, that support a multi-tenant database system as described herein. Although one first instance 350 and one second instance 355 are depicted in the example of FIG. 3, it may be understood that the process flow diagram 300 may include more instances. The process flow diagram 300 illustrated in FIG. 3 may be performed for various tenants of the multiple tenant system.

In some examples, the operations illustrated in the process flow diagram 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added At 305, a first user (e.g., a marketer) of an application server at the first instance 350 (e.g., at a developer organization) may start the process of data packaging. At 310, the application server may create a new data stream. For example, the application server may receive from the first user or otherwise identify a data stream definition. In some examples, the data stream definition may include one or more parameters including at least one of a data source, the import schedule associated with importing the streaming data, a schedule for data refresh, customization information, or a combination thereof. In some examples, the import schedule may indicate a schedule for a full refresh process or a schedule for an incremental refresh process. Additionally or alternatively, the import schedule may indicate a schedule configuration for a daily refresh process or a monthly refresh process.

According to one or more aspects, creating a new data stream may include identifying a data source (e.g., external data source) for the data stream. The application server may identify a data object and a data object field. In some examples, the data object may include a name of the object in the data source. For example, the data object may include a schema and/or a customization associated with the data. In one example, a first data object may include schemas "first name" and "last name" and customization "first name.last name." In some examples, a second data object may include schemas "first name" and "last name." Additionally, the data object field may include a first field "first name" and a second field "last name."

Upon creation of the data stream, at 315, the application server may map data streams to data models. That is, the application server may generate a mapping between a set of source data fields of the data source to a set of target data fields of a data target associated with the application server. As depicted herein, the application server may determine a mapping between the data schema (e.g., data at the data source) and the data target. In some examples, the application server may determine mapping between data fields in the schema and data fields in the target. In some examples, the application server may determine a relationship between two or more data fields in the target. Additionally or alternatively, the application server may determine a data model object storing the data objects at the data target.

At 320, the application server may test and validate the data stream against a data segment. Upon successful testing and validation of the data stream, at 325, the application server may create an upload a data package. In some examples, the application server may upload the data package as a link. For example, the data package may be packaged as a file and uploaded to a public exchange where packaged applications can be downloaded. Thus, the application server may create a data package using a data stream and one or more related data objects. In some examples, the data package may include one or more of a data source, authentication information, periodicity, upstart, normalized mapping information received from the first user, executable metadata defining a process to import data and associated mapping information, or a combination thereof.

At 330, a second user may access the application server from a second user interface associated with the second instance 355 (e.g., at a subscriber organization). As depicted herein, the first user may be a marketer and the second user may be a customer. The application server accessed by the second user may receive a link to a data stream package (generated at 325) that defines metadata of a data source and an import schedule associated with importing streaming data from the data source to a data target associated with the application server. That is, the application server may receive an executable metadata associated with the data stream package that defines the metadata of the data source and the import schedule. The application server may then install the data stream package based on the received link. In some examples, the data stream package may be a managed data stream package or an unmanaged data stream package.

In some examples, the application server may deploy the data stream package based on installing the data stream package. Additionally or alternatively, the application server may receive an input including at least one access key and at least one secret key based on deploying the data stream package. In this way, only individual or entities that have secured the access key from the first instance (e.g., through purchase or other means) may be able to import the data.

At 335, the application server may create a data stream from the data stream package. In particular, the application server may import the streaming data from the data source according to the import schedule based on installing the data stream package. In some examples, the application server may import the streaming data from the data source according to the import schedule based on receiving the input including at least one access key and at least one secret key. In some examples, the application server may receive, at the second user interface, an input indicating the data source. In some instances, importing the streaming data from the data source according to the import schedule may be based on installing the data stream package and receiving the input indicating the data source.

In some examples, the application server may map, based on the metadata of the data source defined in the data stream package, a set of source data fields of the data source to a set of target data fields of the data target. Additionally or alternatively, the application server may identify the customization information (e.g., a field "first name" and a field "last name" concatenated to form a field "first name.last name") associated with the set of source data fields based on the metadata of the data source defined in the data stream package. In some examples, the application server may map the set of source data fields of the data source to the set of target data fields of the data target based on the customization information.

At 340, the application server may validate (or verify) a data model based on importing the streaming data from the data source according to the import schedule. In some examples, mapping the set of source data fields of the data source to the set of target data fields of the data target may further be based on validating the data model. At 345, the application server may test and validate the data stream against a data segment. That is, the application server may validate the mapping of the set of source data fields of the data source to the set of target data fields of the data target.

Figure 4:
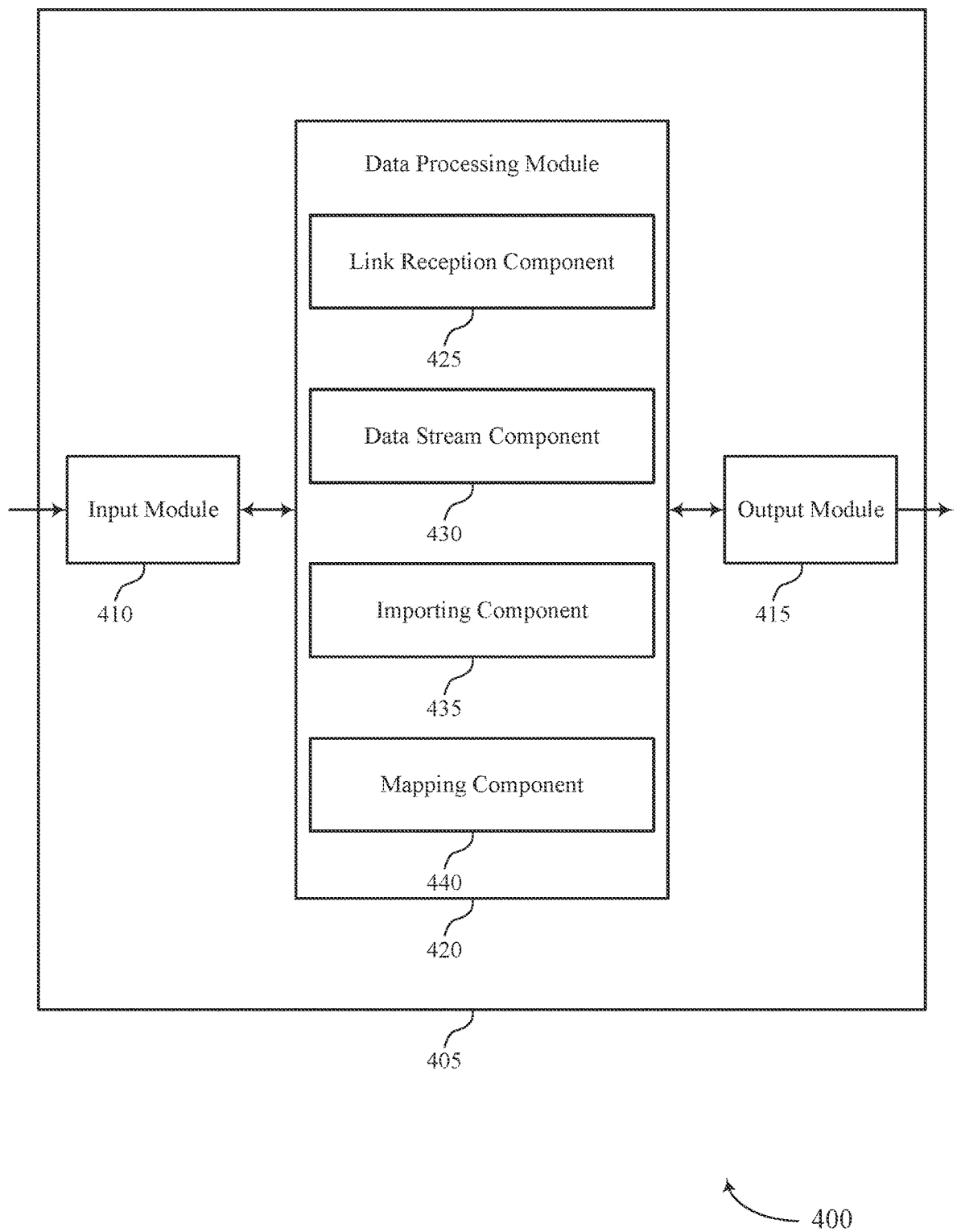
FIG. 4 shows a block diagram of an apparatus that supports data stream packaging in accordance with aspects of the present disclosure.

FIG. 4 shows a block diagram 400 of an apparatus 405 that supports data stream packaging in accordance with aspects of the present disclosure. The apparatus 405 may include an input module 410, an output module 415, and a data processing module 420. The apparatus 405 may also include a processor. Each of these components may be in communication with one another (e.g., via one or more buses).

The input module 410 may manage input signals for the apparatus 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the apparatus 405 for processing. For example, the input module 410 may transmit input signals to the data processing module 620 to support data stream packaging. In some cases, the input module 410 may be a component of an I/O controller 610 as described with reference to FIG. 6.

In some examples, the data processing module 420 may include a link reception component 425, a data stream component 430, an importing component 435, a mapping component 440, or any combination thereof. In some examples, the data processing module 420, or various components thereof, may be configured to perform various operations (e.g., receiving, installing, importing, mapping) using or otherwise in cooperation with the input module 410, the output module 415, or both. For example, the data processing module 420 may receive information from the input module 410, send information to the output module 415, or be integrated in combination with the input module 410, the output module 415, or both to receive information, transmit information, or perform various other operations as described herein.

The data processing module 420 and/or at least some of its various sub-components may be implemented in hardware, software executed by a processor, firmware, or any combination thereof. If implemented in software executed by a processor, the functions of the data processing module 420 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing module 420 and/or at least some of its various sub-components may be physically located at various positions, including being distributed such that portions of functions are implemented at different physical locations by one or more physical devices. In some examples, the data processing module 420 and/or at least some of its various sub-components may be a separate and distinct component in accordance with various aspects of the present disclosure. In other examples, the data processing module 420 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The data processing module 420 may support data packaging at an application server in accordance with examples as disclosed herein. The link reception component 425 may be configured as or otherwise support a means for receiving a link to a data stream package that defines metadata of a data source and an import schedule associated with importing streaming data from the data source to a data target associated with the application server. The data stream component 430 may be configured as or otherwise support a means for installing the data stream package based on the received link.

The importing component 435 may be configured as or otherwise support a means for importing the streaming data from the data source according to the import schedule based on installing the data stream package. The mapping component 440 may be configured as or otherwise support a means for mapping, based on the metadata of the data source defined in the data stream package, a set of source data fields of the data source to a set of target data fields of the data target.

The output module 415 may manage output signals for the apparatus 405. For example, the output module 415 may receive signals from other components of the apparatus 405, such as the data processing module 420, and may transmit these signals to other components or devices. In some specific examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

Figure 5:
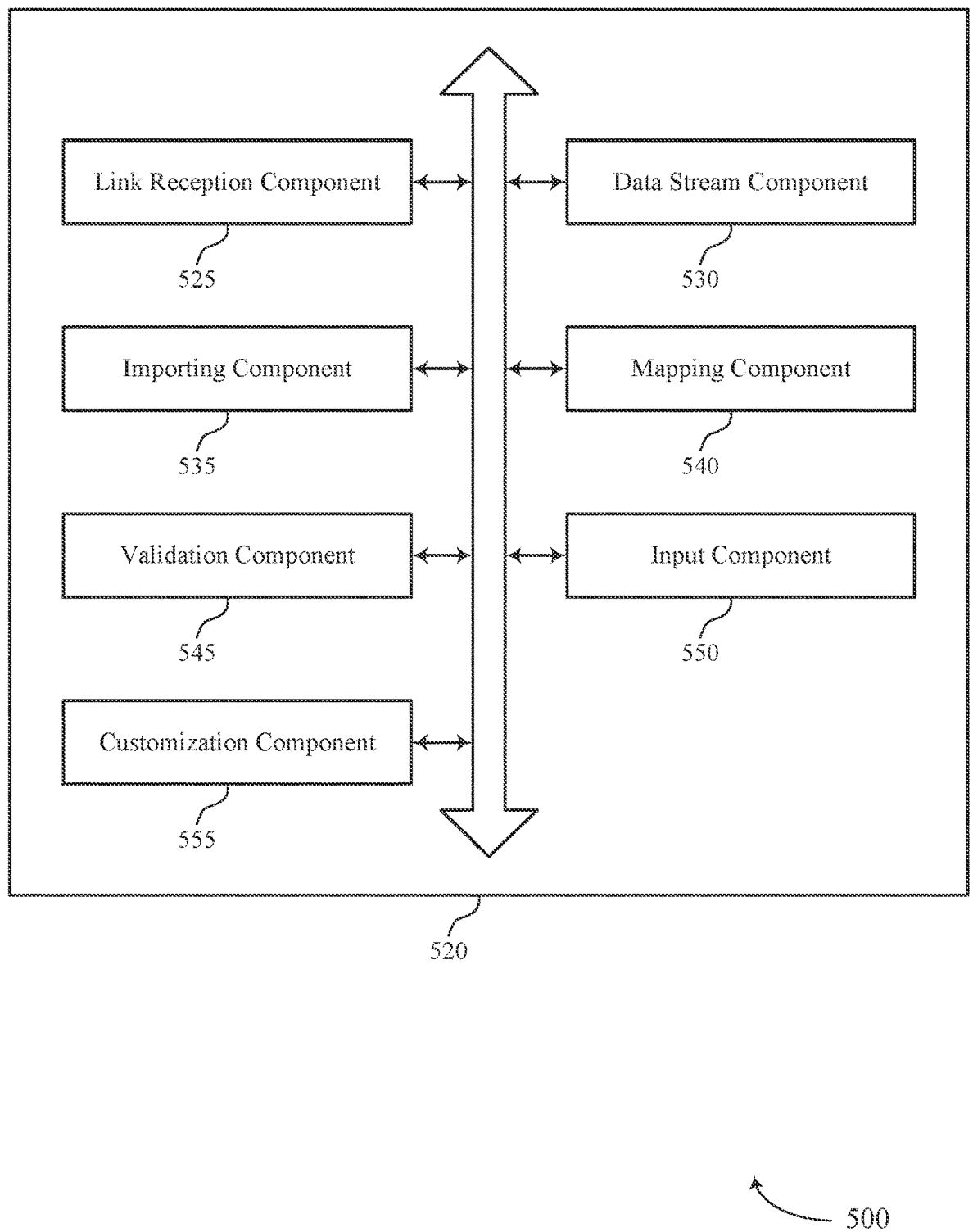
FIG. 5 shows a block diagram of a data processing module that supports data stream packaging in accordance with aspects of the present disclosure.

FIG. 5 shows a block diagram 500 of a data processing module 520 that supports data stream packaging in accordance with aspects of the present disclosure. The data processing module 520 may be an example of aspects of a data processing module 620 or a data processing module 420, or both, as described herein. The data processing module 520, or various components thereof, may be an example of means for performing various aspects of data stream packaging as described herein. For example, the data processing module 520 may include a link reception component 525, a data stream component 530, an importing component 535, a mapping component 540, a validation component 545, an input component 550, a customization component 555, or any combination thereof. Each of these components may communicate, directly or indirectly, with one another (e.g., via one or more buses).

The data processing module 520 may support data packaging at an application server in accordance with examples as disclosed herein. The link reception component 525 may be configured as or otherwise support a means for receiving a link to a data stream package that defines metadata of a data source and an import schedule associated with importing streaming data from the data source to a data target associated with the application server.

The data stream component 530 may be configured as or otherwise support a means for installing the data stream package based on the received link. The importing component 535 may be configured as or otherwise support a means for importing the streaming data from the data source according to the import schedule based on installing the data stream package. The mapping component 540 may be configured as or otherwise support a means for mapping, based on the metadata of the data source defined in the data stream package, a set of source data fields of the data source to a set of target data fields of the data target.

In some examples, the data stream package may be generated based on identifying one or more parameters based on receiving a user input at a first user interface, the one or more parameters including at least one of the data source, the import schedule associated with importing the streaming data, a schedule for data refresh, customization information, or a combination thereof.

In some examples, the input component 550 may be configured as or otherwise support a means for receiving, at a second user interface, an input indicating the data source, where importing the streaming data from the data source according to the import schedule may be based on installing the data stream package and receiving the input indicating the data source.

In some examples, the customization component 555 may be configured as or otherwise support a means for identifying the customization information associated with the set of source data fields based on the metadata of the data source defined in the data stream package, where mapping the set of source data fields of the data source to the set of target data fields of the data target may be further based on the customization information.

In some examples, to support receiving the link to the data stream package, the validation component 545 may be configured as or otherwise support a means for verifying a data model based on importing the streaming data from the data source according to the import schedule, where mapping the set of source data fields of the data source to the set of target data fields of the data target may be further based on verifying the data model.

In some examples, to support receiving the link to the data stream package, the validation component 545 may be configured as or otherwise support a means for validating the mapping of the set of source data fields of the data source to the set of target data fields of the data target. In some examples, to support receiving the link to the data stream package, the link reception component 525 may be configured as or otherwise support a means for receiving an executable metadata associated with the data stream package that defines the metadata of the data source and the import schedule.

In some examples, the data stream component 530 may be configured as or otherwise support a means for deploying the data stream package based on installing the data stream package. In some examples, the input component 550 may be configured as or otherwise support a means for receiving an input including at least one access key and at least one secret key based on deploying the data stream package, where importing the streaming data from the data source according to the import schedule may be based on receiving the input. In some examples, the import schedule indicates a schedule for a full refresh process or a schedule for an incremental refresh process.

Figure 6:
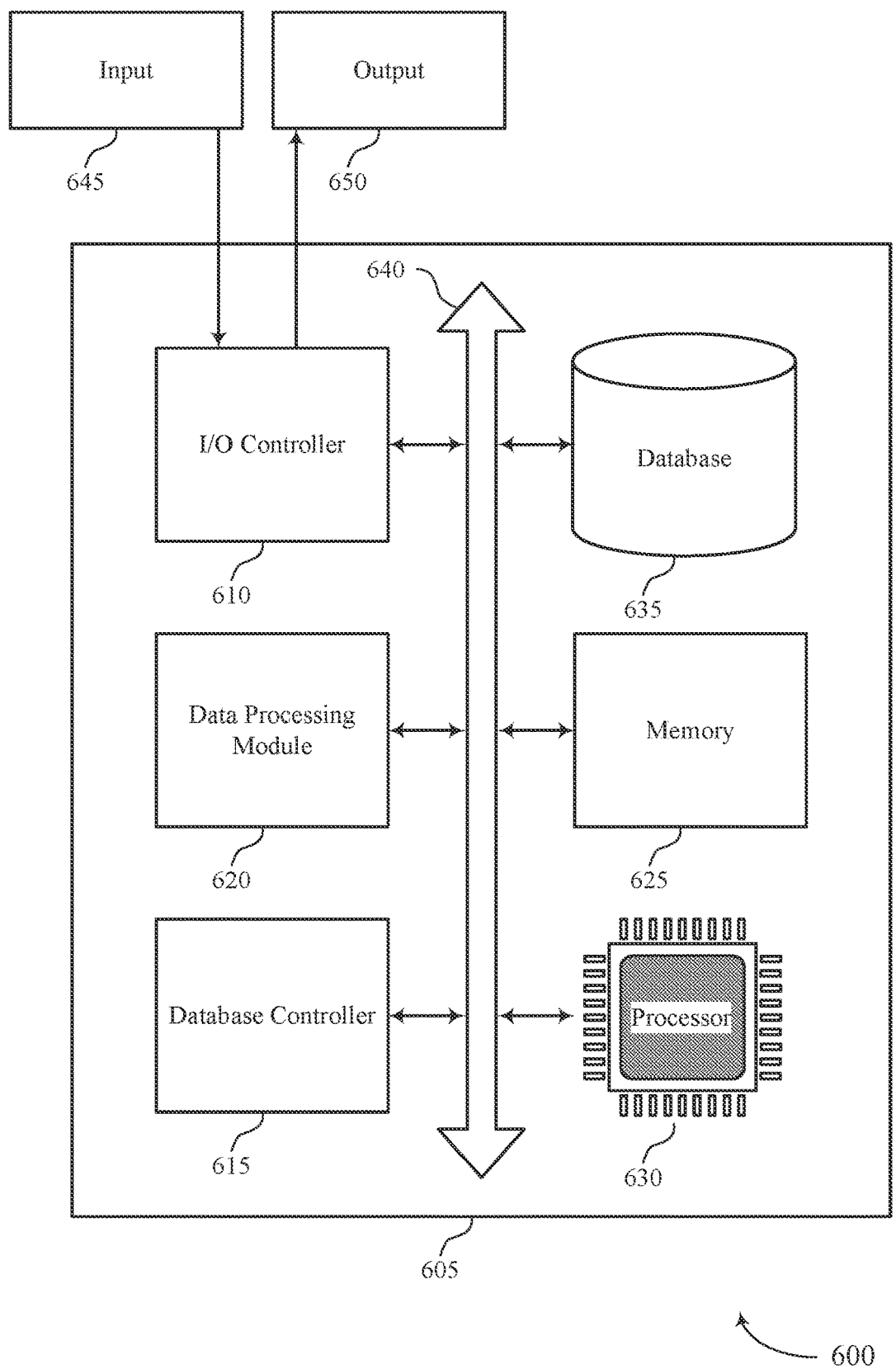
FIG. 6 shows a diagram of a system including a device that supports data stream packaging in accordance with aspects of the present disclosure.

FIG. 6 shows a diagram of a system 600 including a device 605 that supports data stream packaging in accordance with aspects of the present disclosure. The device 605 may be an example of or include the components of an apparatus 405 as described herein. The device 605 may include components for bi-directional voice and data communications including components for transmitting and receiving communications, such as a data processing module 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The data processing module 620 may be an example of a data processing module 420 or 520 as described herein. For example, the data processing module 620 may perform any of the methods or processes described herein with reference to FIGS. 4 and 5. In some cases, the data processing module 620 may be implemented in hardware, software executed by a processor, firmware, or any combination thereof.

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor. In some cases, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor to perform various functions described herein. In some cases, the memory 625 may contain, among other things, a basic input/output system (BIOS) which may control basic hardware or software operation such as the interaction with peripheral components or devices.

The processor 630 may include an intelligent hardware device, (e.g., a general-purpose processor, a digital signal processor (DSP), a central processing unit (CPU), a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting data stream packaging).

The data processing module 620 may support data packaging at an application server in accordance with examples as disclosed herein. For example, the data processing module 620 may be configured as or otherwise support a means for receiving a link to a data stream package that defines metadata of a data source and an import schedule associated with importing streaming data from the data source to a data target associated with the application server. The data processing module 620 may be configured as or otherwise support a means for installing the data stream package based on the received link. The data processing module 620 may be configured as or otherwise support a means for importing the streaming data from the data source according to the import schedule based on installing the data stream package. The data processing module 620 may be configured as or otherwise support a means for mapping, based on the metadata of the data source defined in the data stream package, a set of source data fields of the data source to a set of target data fields of the data target.

Figure 7:
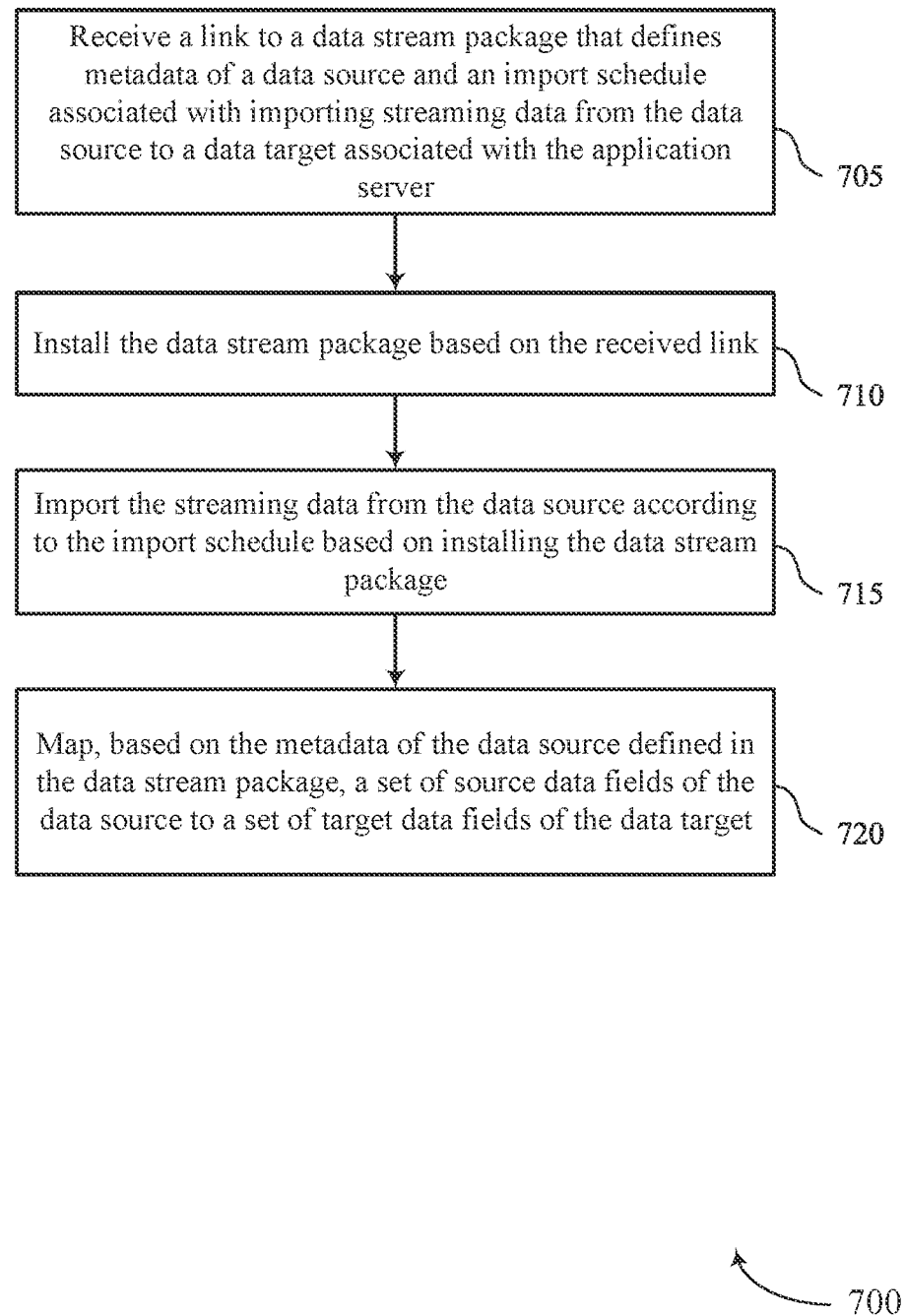
FIGS. 7 through 10 show flowcharts illustrating methods that support data stream packaging in accordance with aspects of the present disclosure.

FIG. 7 shows a flowchart illustrating a method 700 that supports data stream packaging in accordance with aspects of the present disclosure. The operations of the method 700 may be implemented by an application server or its components as described herein. For example, the operations of the method 700 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 705, the method may include receiving a link to a data stream package that defines metadata of a data source and an import schedule associated with importing streaming data from the data source to a data target associated with the application server. The operations of 705 may be performed in accordance with examples as disclosed herein. In some examples, aspects of the operations of 705 may be performed by a link reception component 525 as described with reference to FIG. 5.

At 710, the method may include installing the data stream package based on the received link. The operations of 710 may be performed in accordance with examples as disclosed herein. In some examples, aspects of the operations of 710 may be performed by a data stream component 530 as described with reference to FIG. 5.

At 715, the method may include importing the streaming data from the data source according to the import schedule based on installing the data stream package. The operations of 715 may be performed in accordance with examples as disclosed herein. In some examples, aspects of the operations of 715 may be performed by an importing component 535 as described with reference to FIG. 5.

At 720, the method may include mapping, based on the metadata of the data source defined in the data stream package, a set of source data fields of the data source to a set of target data fields of the data target. The operations of 720 may be performed in accordance with examples as disclosed herein. In some examples, aspects of the operations of 720 may be performed by a mapping component 540 as described with reference to FIG. 5.

Figure 8:
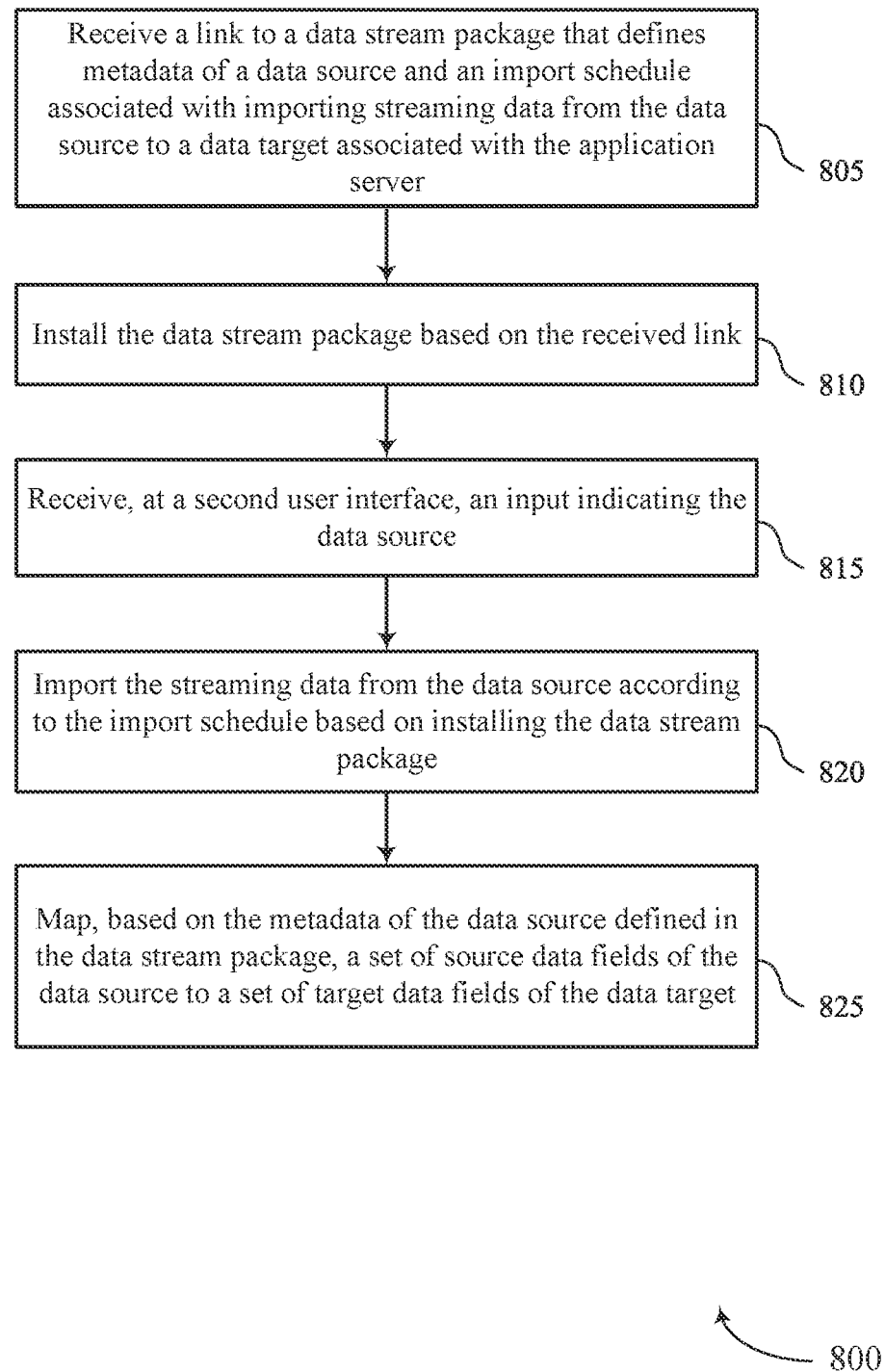

FIG. 8 shows a flowchart illustrating a method 800 that supports data stream packaging in accordance with aspects of the present disclosure. The operations of the method 800 may be implemented by an application server or its components as described herein. For example, the operations of the method 800 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 805, the method may include receiving a link to a data stream package that defines metadata of a data source and an import schedule associated with importing streaming data from the data source to a data target associated with the application server. The operations of 805 may be performed in accordance with examples as disclosed herein. In some examples, aspects of the operations of 805 may be performed by a link reception component 525 as described with reference to FIG. 5.

At 810, the method may include installing the data stream package based on the received link. The operations of 810 may be performed in accordance with examples as disclosed herein. In some examples, aspects of the operations of 810 may be performed by a data stream component 530 as described with reference to FIG. 5.

At 815, the method may include receiving, at a second user interface, an input indicating the data source. The operations of 815 may be performed in accordance with examples as disclosed herein. In some examples, aspects of the operations of 815 may be performed by an input component 550 as described with reference to FIG. 5.

At 820, the method may include importing the streaming data from the data source according to the import schedule based on installing the data stream package. In some examples, importing the streaming data from the data source according to the import schedule may be based on installing the data stream package and receiving the input indicating the data source. The operations of 820 may be performed in accordance with examples as disclosed herein. In some examples, aspects of the operations of 820 may be performed by an importing component 535 as described with reference to FIG. 5.

At 825, the method may include mapping, based on the metadata of the data source defined in the data stream package, a set of source data fields of the data source to a set of target data fields of the data target. The operations of 825 may be performed in accordance with examples as disclosed herein. In some examples, aspects of the operations of 825 may be performed by a mapping component 540 as described with reference to FIG. 5.

Figure 9:
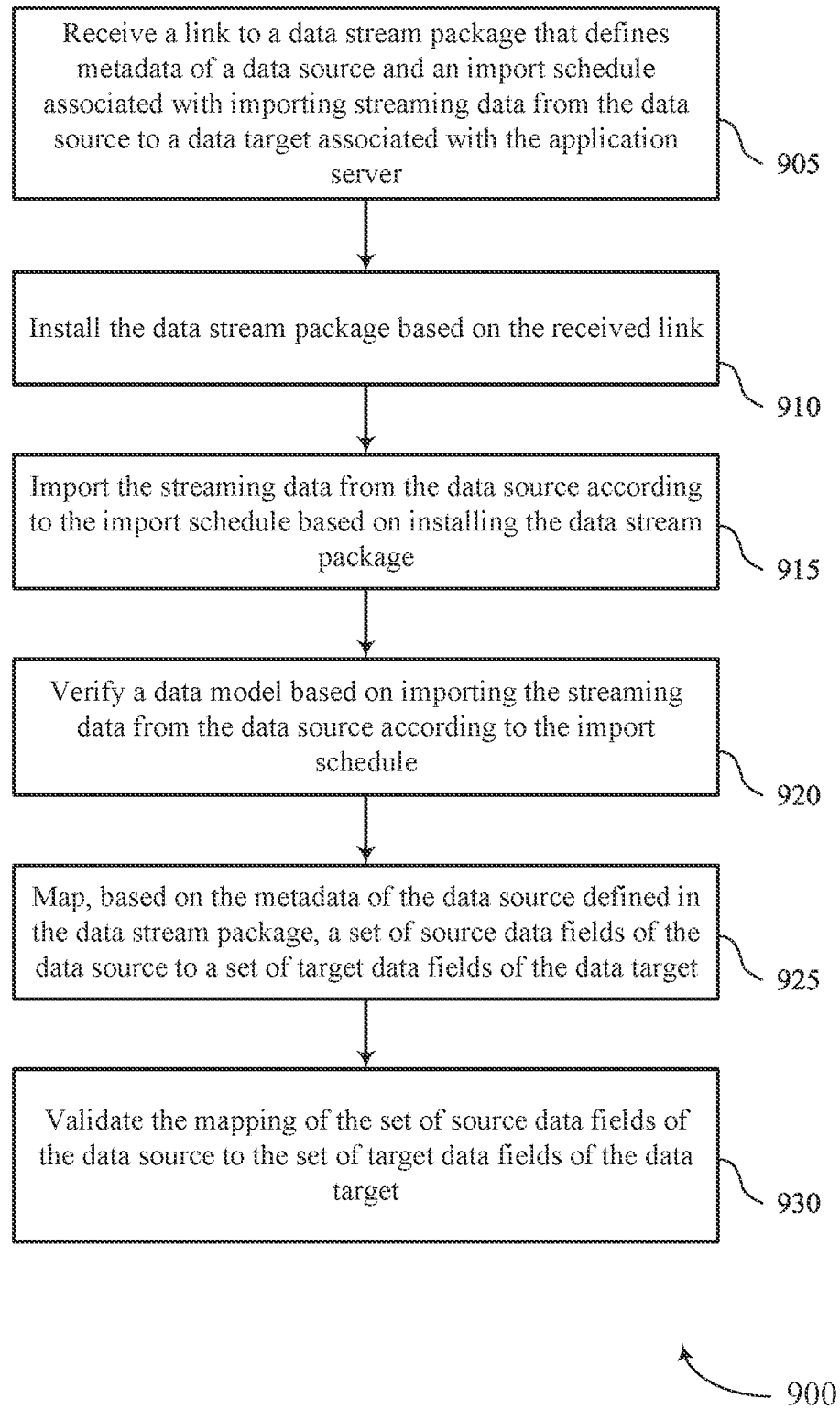

FIG. 9 shows a flowchart illustrating a method 900 that supports data stream packaging in accordance with aspects of the present disclosure. The operations of the method 900 may be implemented by an application server or its components as described herein. For example, the operations of the method 900 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 905, the method may include receiving a link to a data stream package that defines metadata of a data source and an import schedule associated with importing streaming data from the data source to a data target associated with the application server. The operations of 905 may be performed in accordance with examples as disclosed herein. In some examples, aspects of the operations of 905 may be performed by a link reception component 525 as described with reference to FIG. 5.

At 910, the method may include installing the data stream package based on the received link. The operations of 910 may be performed in accordance with examples as disclosed herein. In some examples, aspects of the operations of 910 may be performed by a data stream component 530 as described with reference to FIG. 5.

At 915, the method may include importing the streaming data from the data source according to the import schedule based on installing the data stream package. The operations of 915 may be performed in accordance with examples as disclosed herein. In some examples, aspects of the operations of 915 may be performed by an importing component 535 as described with reference to FIG. 5.

At 920, the method may include verifying a data model based on importing the streaming data from the data source according to the import schedule. The operations of 920 may be performed in accordance with examples as disclosed herein. In some examples, aspects of the operations of 920 may be performed by a validation component 545 as described with reference to FIG. 5.

At 925, the method may include mapping, based on the metadata of the data source defined in the data stream package, a set of source data fields of the data source to a set of target data fields of the data target. In some examples, mapping the set of source data fields of the data source to the set of target data fields of the data target may be further based at on verifying the data model. The operations of 925 may be performed in accordance with examples as disclosed herein. In some examples, aspects of the operations of 925 may be performed by a mapping component 540 as described with reference to FIG. 5.

At 930, the method may include validating the mapping of the set of source data fields of the data source to the set of target data fields of the data target. The operations of 930 may be performed in accordance with examples as disclosed herein. In some examples, aspects of the operations of 930 may be performed by a validation component 545 as described with reference to FIG. 5.

Figure 10:
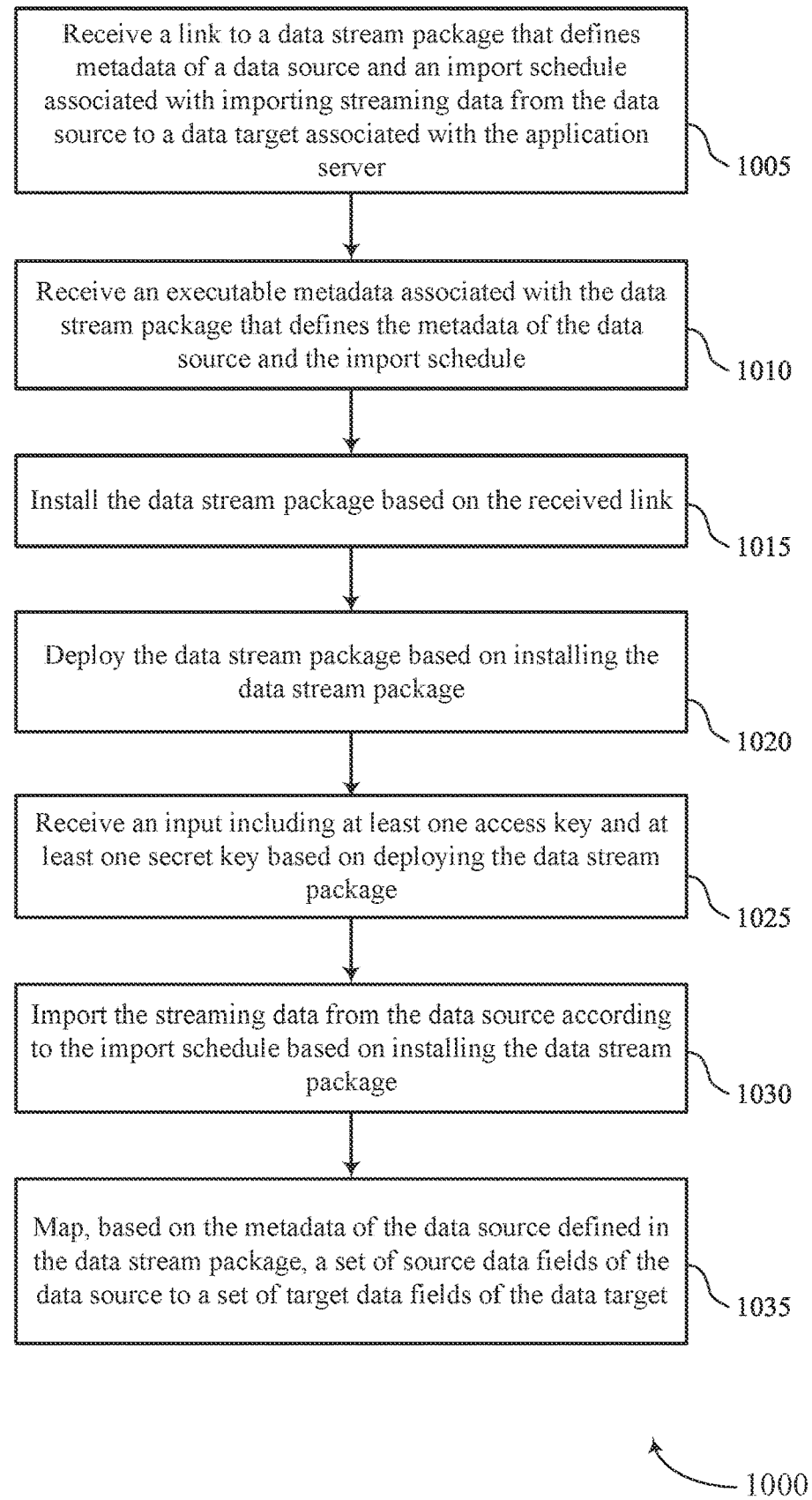

FIG. 10 shows a flowchart illustrating a method 1000 that supports data stream packaging in accordance with aspects of the present disclosure. The operations of the method 1000 may be implemented by an application server or its components as described herein. For example, the operations of the method 1000 may be performed by an application server as described with reference to FIGS. 1 through 6. In some examples, an application server may execute a set of instructions to control the functional elements of the application server to perform the described functions. Additionally or alternatively, the application server may perform aspects of the described functions using special-purpose hardware.

At 1005, the method may include receiving a link to a data stream package that defines metadata of a data source and an import schedule associated with importing streaming data from the data source to a data target associated with the application server. The operations of 1005 may be performed in accordance with examples as disclosed herein. In some examples, aspects of the operations of 1005 may be performed by a link reception component 525 as described with reference to FIG. 5.

At 1010, the method may include receiving an executable metadata associated with the data stream package that defines the metadata of the data source and the import schedule. The operations of 1010 may be performed in accordance with examples as disclosed herein. In some examples, aspects of the operations of 1010 may be performed by a link reception component 525 as described with reference to FIG. 5.

At 1015, the method may include installing the data stream package based on the received link. The operations of 1015 may be performed in accordance with examples as disclosed herein. In some examples, aspects of the operations of 1015 may be performed by a data stream component 530 as described with reference to FIG. 5.

At 1020, the method may include deploying the data stream package based on installing the data stream package. The operations of 1020 may be performed in accordance with examples as disclosed herein. In some examples, aspects of the operations of 1020 may be performed by a data stream component 530 as described with reference to FIG. 5.

At 1025, the method may include receiving an input including at least one access key and at least one secret key based on deploying the data stream package. The operations of 1025 may be performed in accordance with examples as disclosed herein. In some examples, aspects of the operations of 1025 may be performed by an input component 550 as described with reference to FIG. 5.

At 1030, the method may include importing the streaming data from the data source according to the import schedule based on installing the data stream package. In some examples, importing the streaming data from the data source according to the import schedule may be based on receiving the input. The operations of 1030 may be performed in accordance with examples as disclosed herein. In some examples, aspects of the operations of 1030 may be performed by an importing component 535 as described with reference to FIG. 5.

At 1035, the method may include mapping, based on the metadata of the data source defined in the data stream package, a set of source data fields of the data source to a set of target data fields of the data target. The operations of 1035 may be performed in accordance with examples as disclosed herein. In some examples, aspects of the operations of 1035 may be performed by a mapping component 540 as described with reference to FIG. 5.

A method for data packaging at an application server is described. The method may include receiving a link to a data stream package that defines metadata of a data source and an import schedule associated with importing streaming data from the data source to a data target associated with the application server, installing the data stream package based on the received link, importing the streaming data from the data source according to the import schedule based on installing the data stream package, and mapping, based on the metadata of the data source defined in the data stream package, a set of source data fields of the data source to a set of target data fields of the data target.

An apparatus for data packaging at an application server is described. The apparatus may include a processor, memory in electronic communication with the processor, and instructions stored in the memory. The instructions may be executable by the processor to cause the apparatus to receive a link to a data stream package that defines metadata of a data source and an import schedule associated with importing streaming data from the data source to a data target associated with the application server, install the data stream package based on the received link, import the streaming data from the data source according to the import schedule based on installing the data stream package, and mapping, based on the metadata of the data source defined in the data stream package, a set of source data fields of the data source to a set of target data fields of the data target.

Another apparatus for data packaging at an application server is described. The apparatus may include means for receiving a link to a data stream package that defines metadata of a data source and an import schedule associated with importing streaming data from the data source to a data target associated with the application server, means for installing the data stream package based on the received link, means for importing the streaming data from the data source according to the import schedule based on installing the data stream package, and means for mapping, based on the metadata of the data source defined in the data stream package, a set of source data fields of the data source to a set of target data fields of the data target.

A non-transitory computer-readable medium storing code for data packaging at an application server is described. The code may include instructions executable by a processor to receive a link to a data stream package that defines metadata of a data source and an import schedule associated with importing streaming data from the data source to a data target associated with the application server, install the data stream package based on the received link, import the streaming data from the data source according to the import schedule based on installing the data stream package, and map, based on the metadata of the data source defined in the data stream package, a set of source data fields of the data source to a set of target data fields of the data target.

In some examples of the method, apparatuses, and non-transitory computer-readable medium described herein, the data stream package may be generated based on identifying one or more parameters based on receiving a user input at a first user interface, the one or more parameters including at least one of the data source, the import schedule associated with importing the streaming data, a schedule for data refresh, customization information, or a combination thereof.

Some examples of the method, apparatuses, and non-transitory computer-readable medium described herein may further include operations, features, means, or instructions for receiving, at a second user interface, an input indicating the data source, where importing the streaming data from the data source according to the import schedule may be based on installing the data stream package and receiving the input indicating the data source.

Some examples of the method, apparatuses, and non-transitory computer-readable medium described herein may further include operations, features, means, or instructions for identifying the customization information associated with the set of source data fields based on the metadata of the data source defined in the data stream package, where mapping the set of source data fields of the data source to the set of target data fields of the data target may be further based on the customization information.

In some examples of the method, apparatuses, and non-transitory computer-readable medium described herein, receiving the link to the data stream package may include operations, features, means, or instructions for verifying a data model based on importing the streaming data from the data source according to the import schedule, where mapping the set of source data fields of the data source to the set of target data fields of the data target may be further based on verifying the data model.

In some examples of the method, apparatuses, and non-transitory computer-readable medium described herein, receiving the link to the data stream package may include operations, features, means, or instructions for validating the mapping of the set of source data fields of the data source to the set of target data fields of the data target. In some examples of the method, apparatuses, and non-transitory computer-readable medium described herein, receiving the link to the data stream package may include operations, features, means, or instructions for receiving an executable metadata associated with the data stream package that defines the metadata of the data source and the import schedule.

Some examples of the method, apparatuses, and non-transitory computer-readable medium described herein may further include operations, features, means, or instructions for deploying the data stream package based on installing the data stream package and receiving an input including at least one access key and at least one secret key based on deploying the data stream package, where importing the streaming data from the data source according to the import schedule may be based on receiving the input. In some examples of the method, apparatuses, and non-transitory computer-readable medium described herein, the import schedule indicates a schedule for a full refresh process or a schedule for an incremental refresh process.

It should be noted that the methods described herein describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data packaging at an application server, comprising:
  receiving a link to a data stream package that defines metadata of a data source and an import schedule associated with importing streaming data from the data source to a data target associated with the application server;
  installing the data stream package based at least in part on the received link;

importing the streaming data from the data source according to the import schedule based at least in part on installing the data stream package; and mapping, based at least in part on the metadata of the data source defined in the data stream package, a set of source data fields of the data source to a set of target data fields of the data target.

2. The method of claim 1, wherein the data stream package is generated based at least in part on identifying one or more parameters based at least in part on receiving a user input at a first user interface, the one or more parameters comprising at least one of the data source, the import schedule associated with importing the streaming data, a schedule for data refresh, customization information, or a combination thereof.

3. The method of claim 2, further comprising:
receiving, at a second user interface, an input indicating the data source, wherein importing the streaming data from the data source according to the import schedule is based at least in part on installing the data stream package and receiving the input indicating the data source.

4. The method of claim 2, further comprising:
identifying the customization information associated with the set of source data fields based at least in part on the metadata of the data source defined in the data stream package, wherein mapping the set of source data fields of the data source to the set of target data fields of the data target is further based at least in part on the customization information.

5. The method of claim 1, wherein receiving the link to the data stream package comprises:
verifying a data model based at least in part on importing the streaming data from the data source according to the import schedule, wherein mapping the set of source data fields of the data source to the set of target data fields of the data target is further based at least in part on verifying the data model.

6. The method of claim 1, wherein receiving the link to the data stream package comprises:
validating the mapping of the set of source data fields of the data source to the set of target data fields of the data target.

7. The method of claim 1, wherein receiving the link to the data stream package comprises:
receiving an executable metadata associated with the data stream package that defines the metadata of the data source and the import schedule.

8. The method of claim 1, further comprising:
deploying the data stream package based at least in part on installing the data stream package; and
receiving an input comprising at least one access key and at least one secret key based at least in part on deploying the data stream package, wherein importing the streaming data from the data source according to the import schedule is based at least in part on receiving the input.

9. The method of claim 1, wherein the import schedule indicates a schedule for a full refresh process or a schedule for an incremental refresh process.

10. An apparatus for data packaging at an application server, comprising:
a processor;
memory coupled with the processor; and
instructions stored in the memory and executable by the processor to cause the apparatus to:

receive a link to a data stream package that defines metadata of a data source and an import schedule associated with importing streaming data from the data source to a data target associated with the application server;
install the data stream package based at least in part on the received link;
import the streaming data from the data source according to the import schedule based at least in part on installing the data stream package; and
map, based at least in part on the metadata of the data source defined in the data stream package, a set of source data fields of the data source to a set of target data fields of the data target.

11. The apparatus of claim 10, wherein the data stream package is generated based at least in part on identifying one or more parameters based at least in part on receiving a user input at a first user interface, the one or more parameters comprising at least one of the data source, the import schedule associated with importing the streaming data, a schedule for data refresh, customization information, or a combination thereof.

12. The apparatus of claim 11, wherein the instructions are further executable by the processor to cause the apparatus to:
receive, at a second user interface, an input indicating the data source, wherein importing the streaming data from the data source according to the import schedule is based at least in part on installing the data stream package and receiving the input indicating the data source.

13. The apparatus of claim 11, wherein the instructions are further executable by the processor to cause the apparatus to:
identify the customization information associated with the set of source data fields based at least in part on the metadata of the data source defined in the data stream package, wherein mapping the set of source data fields of the data source to the set of target data fields of the data target is further based at least in part on the customization information.

14. The apparatus of claim 10, wherein the instructions to receive the link to the data stream package are executable by the processor to cause the apparatus to:
verify a data model based at least in part on importing the streaming data from the data source according to the import schedule, wherein mapping the set of source data fields of the data source to the set of target data fields of the data target is further based at least in part on verifying the data model.

15. The apparatus of claim 10, wherein the instructions to receive the link to the data stream package are executable by the processor to cause the apparatus to:
validate the mapping of the set of source data fields of the data source to the set of target data fields of the data target.

16. The apparatus of claim 10, wherein the instructions to receive the link to the data stream package are executable by the processor to cause the apparatus to:
receive an executable metadata associated with the data stream package that defines the metadata of the data source and the import schedule.

17. The apparatus of claim 10, wherein the instructions are further executable by the processor to cause the apparatus to:
deploy the data stream package based at least in part on installing the data stream package; and
receive an input comprising at least one access key and at least one secret key based at least in part on deploying the data stream package, wherein importing the streaming data from the data source according to the import schedule is based at least in part on receiving the input.

18. The apparatus of claim 10, wherein the import schedule indicates a schedule for a full refresh process or a schedule for an incremental refresh process.

19. A non-transitory computer-readable medium storing code for data processing, the code comprising instructions executable by a processor to:

receive a link to a data stream package that defines metadata of a data source and an import schedule associated with importing streaming data from the data source to a data target associated with the application server;

install the data stream package based at least in part on the received link;

import the streaming data from the data source according to the import schedule based at least in part on installing the data stream package; and map, based at least in part on the metadata of the data source defined in the data stream package, a set of source data fields of the data source to a set of target data fields of the data target.

20. The non-transitory computer-readable medium of claim 19, wherein the data stream package is generated based at least in part on identifying one or more parameters based at least in part on receiving a user input at a first user interface, the one or more parameters comprising at least one of the data source, the import schedule associated with importing the streaming data, a schedule for data refresh, customization information, or a combination thereof.

* * * * *